Aug. 3, 1965 W. C. CRUTCHER 3,198,433
CONTROLLED HUMIDIFIER
Filed July 25, 1962 2 Sheets-Sheet 1

INVENTOR
W. C. Crutcher

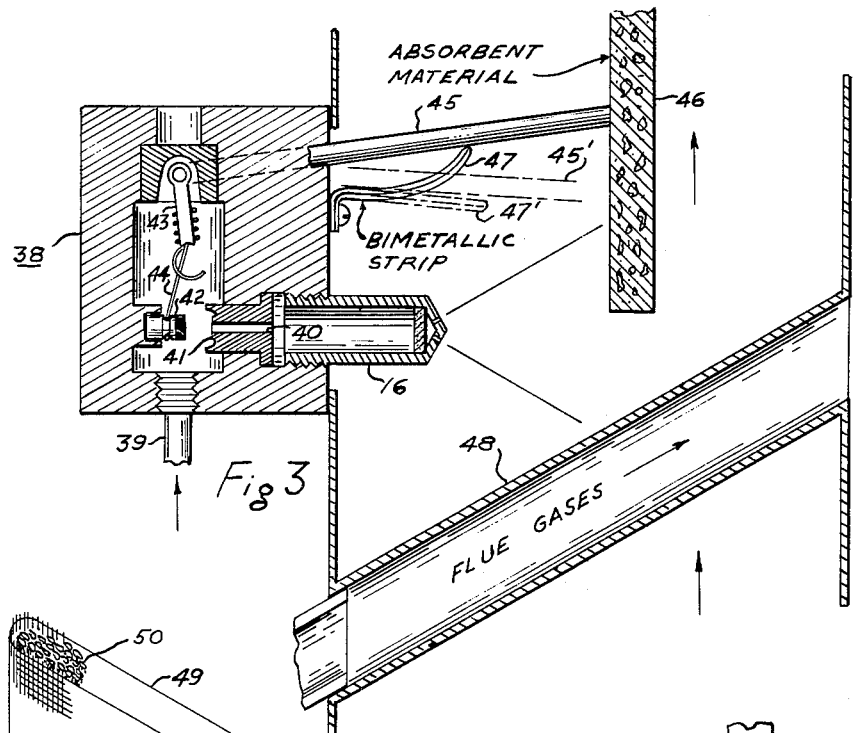
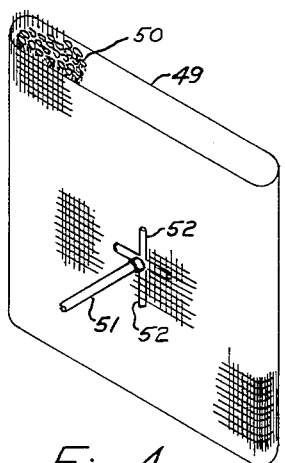
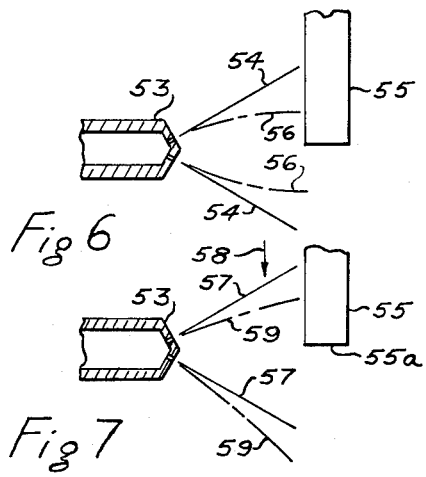
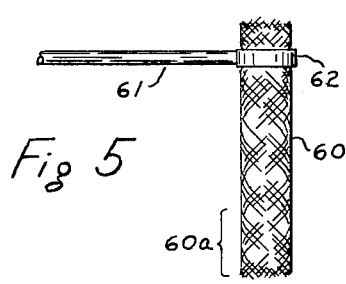

United States Patent Office 3,198,433
Patented Aug. 3, 1965

3,198,433
CONTROLLED HUMIDIFIER
William C. Crutcher, Scotia, N.Y., assignor to General
Electric Company, a corporation of New York
Filed July 25, 1962, Ser. No. 212,405
9 Claims. (Cl. 236—44)

This invention relates to an improved humidifier with means for controlling the amount of moisture injected in a way so as to be responsive to the actual need for moisture or, in other words, responsive to the ambient humidity of the space being humidified. More particularly, the invention relates to an improved, inexpensive, controlled humidifier suitable for use in a home heating system, and designed to maintain a selected constant humidity, despite variations in ambient humidity, air flow, or water pressure.

Humidifiers for home heating systems are generally either of the evaporative type or of the atomizer type. They are usually employed in the winter months, since the air, when heated, undergoes a decrease in relative humidity. Excessive dryness of the air can cause health problems and use of additional heating fuel.

The evaporative type humidifier depends upon the natural rate of evaporation from a large number of plates kept saturated with water from a pan with a float valve. These plates are subject to deposition of residue and, although they are responsive, to some extent, to the actual requirements for additional moisture, they are often inadequate in providing sufficient moisture addition.

Atomizing type units, although capable of injecting large quantities of moisture into the system, are unresponsive to actual requirements for the moisture, unless they are employed with a "humidistat" or other humidity-responsive device to control the operation of the atomizer unit. Atomizer type humidifiers use several components such as a motor, impeller pump, etc., and are relatively expensive.

Accordingly, one object of the present invention is to provide an improved humidifier, which adds adequate moisture to air being heated, yet which is responsive also to the amount of moisture required.

Another object of the invention is to provide an improved humidifier control, which adds moisture according to the amount required, while also compensating for variations in line water pressure and air flow through the heating system.

Still another object of the invention is to provide a simplified humidifier which is inexpensive to manufacture and which is applicable to either forced-draft or gravity-flow home heating systems.

Yet another object of the invention is to disclose an improved humidifier which automatically becomes inoperative when the furnace is not operating.

The invention, both as to organization and method of practice, together with other objects and advantages thereof, will become apparent from the following description, taken in connection with the accompanying drawings, in which;

FIG. 3 is an enlarged elevation view, partly in section, of another form of the humidifier control suitable for use with a gravity-flow heating system;

FIG. 4 is a perspective view of a modified form of the moisture control member used to practice the invention;

FIG. 5 shows another modification of the moisture control member;

FIG. 6 is a schematic view showing an arrangement which compensates for variations in water supply pressure, and FIG. 7 is a schematic view showing an arrangement which compensates for variations in air flow.

Briefly stated, the invention is practiced by providing an atomizing spray nozzle disposed to spray a portion of the humidifying water on a special moisture control member, which, in turn, is disposed to present a large evaporative surface to the air flow. The moisture control member is adapted to move so as to control the admission of water to the atomizing nozzle by its variations in weight. The time required to periodically saturate and dry out the moisture control member is dependent on the humidity of the air flowing past it. Means may be provided to make the humidifier inoperative, when the air flowing through the system is not being heated.

Figure 1:
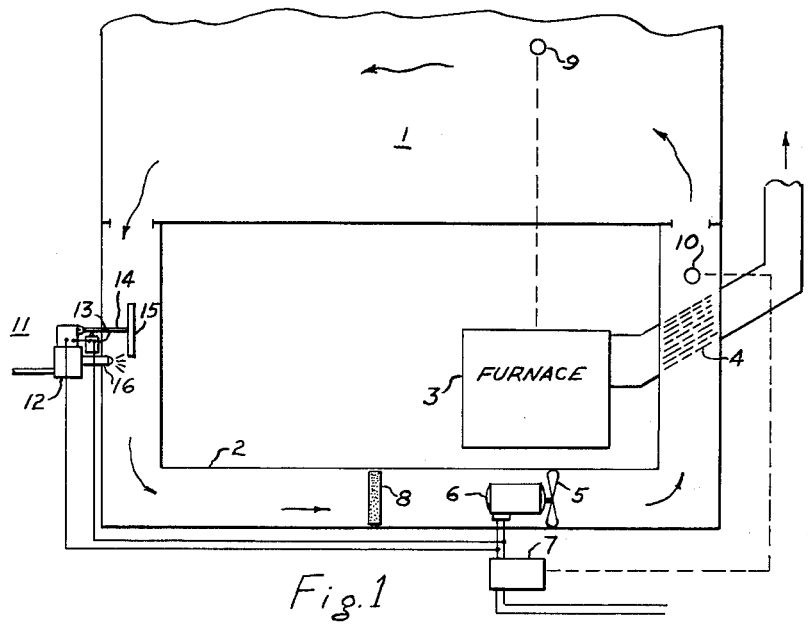
FIG. 1 is a schematic view of a typical forced-draft home heating system incorporating the invention.

Referring now to FIG. 1 of the drawing, a typical heating system for a house 1 comprises a recirculating duct system 2, through which is circulated air heated by a furnace 3. The furnace exhausts hot flue gases through heat exchanger pipes 4, thereby heating air in the duct system 2. The air is forced to circulate in a closed circuit by means of the blower 5, when the blower motor 6 is actuated by power relay 7. A filter 8 upstream of the blower removes dust particles from the returning cold air.

A typical temperature control for the heating system of FIG. 1 employs a room thermostat 9, which periodically turns on furnace 3. When the air near furnace pipes 4 reaches a certain maximum temperature, an additional thermostat 10 actuates the relay 7 and turns on the blower motor 6. The foregoing comprises one type of forced-draft installation, although the present invention is not limited to this type of installation, but includes other types, as well as gravity-flow systems.

One version of my improved controlled humidifier suitable for use with such an installation is shown generally as 11, and includes a "normally-off" solenoid valve 12 connected in series with a "normally-on" microswitch 13. The circuit including valve 12 and switch 13 is connected to the leads supplying blower motor 6, so that the circuit will be actuated when the blower is on. A pivoted arm 14 holds an absorbent moisture control member 15 in position to receive a portion of the water sprayed by a nozzle 16, when valve 12 is open.

Figure 2:
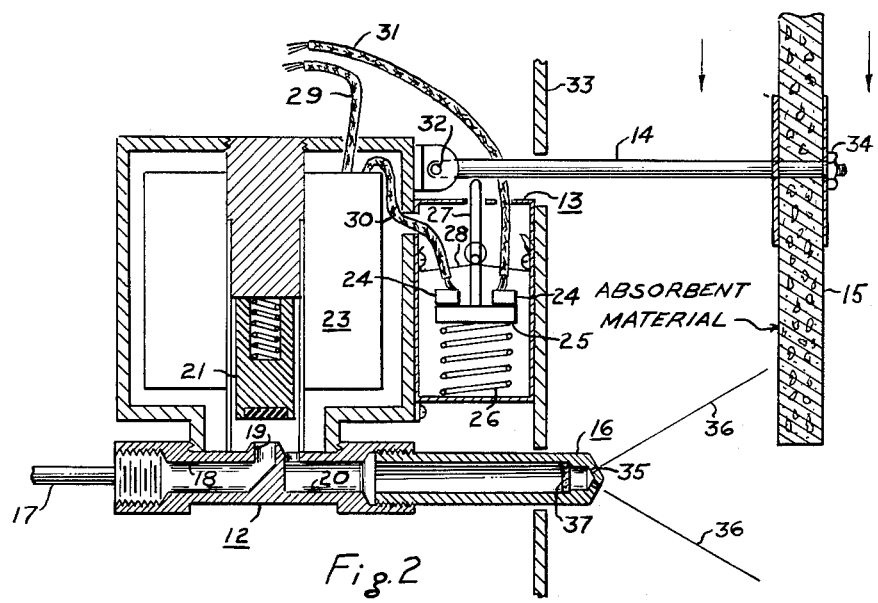
FIG. 2 is an enlarged elevation view, partly in section, illustrating one form of the humidifier control for use with the heating system of FIG. 1.

A better understanding of the humidifier 11 may be had by reference to the enlarged view of FIG. 2, wherein the solenoid valve, shown generally as 12, is supplied by pipe 17 from a source of water under pressure, which may be normal waterline pressure. Water enters through inlet passage 18 and through the valve port 19 to the valve outlet passage 20. A spring-loaded plunger 21 closes valve port 19, unless the plunger is held in the elevated position shown, by current passing through solenoid coil 23, in a manner well known in the art.

Solenoid coil 23 is connected in series with a "normally-on" sensitive switch 13. The switch includes contacts 24, which are electrically connected by a jumper 25 held against the contacts by a spring 26. An actuating pin 27 serves to depress jumper 25 and open the circuit. An over-center spring mechanism 28 provides a positive off-on action of the switch. The wiring includes a lead 29 connected to one end of the solenoid coil, a lead 30 from the other end of the solenoid coil to one of the contacts 24, and a lead 31 connected to the other contact 24. Leads 29, 30 are connected to the wires supplying the blower motor, so that the solenoid coil 23 is actuated when the blower is energized, provided that switch 13 is also closed.

The actuator rod 27 is operated by means of the lever arm 14 pivoted at 32. Lever 14 extends through the wall 33 of the duct 2 into the path of the recirculating cold air returning from the house. Attached to the outer end of arm 14, by means of nut 34, is a moisture control member 15. Member 15 is preferably a flat plate made of porous absorbent material which, when it is sprayed with water near one end, will act as a wick to distribute water throughout its entirety and gradually become saturated. Several materials are suitable for the moisture control member 15, some of these being natural or artificial sponge material, porous ceramic, or densely packed natural or synthetic fibers. Also it is desirable that the material be relatively light with respect to the weight of the water which it will absorb. The weight of moisture control member 15 is selected, so that when substantially dry, it will be held up by spring 26, but so that when substantially saturated, its added weight will actuate switch 13 and open contacts 24.

Moisture control member 15 may be of any desired shape, such as a circular or rectangular plate, or a cylindrical shape. Preferably it is constructed so as to present a fairly large surface area to the air passing through the heating system. It should also be aligned parallel to the air flow as shown so as to present minimum resistance to flow.

Threaded to the outlet of solenoid valve 12 is an atomizing spray nozzle 16, which may be of any desired type to create a fine atomized mist of water from the nozzle using the natural water pressure in line 17. The nozzle shown is of the type commonly used in oil burners and has a very low rate of flow, perhaps on the order of one gallon per hour or less. It has very small spray ports 35 in its end, which create an atomized spray cone between lines 36. A filter 37 upstream of the spray ports removes foreign particles from the water.

Moisture control member 15 is disposed so that a portion of the spray impinges upon a portion of it, here its lower end. A certain time interval will therefore be required for water to soak up through the entire length of member 15 before it becomes saturated. It is also to be noted that the weight of member 15 is selected with relation to the leverage provided by arm 14 and the spring biasing action of spring 26, so that member 15 is very delicately balanced with respect to its dry weight and its wet weight. Thus the added weight of the water when member 15 is substantially saturated will cause the lever 14 to depress actuator rod 27 and open the contacts 24 of the switch 13 so as to de-energize the solenoid valve 12.

The foregoing humidifier and control are suitable for use with a forced-draft furnace when connected to the blower, since the humidifier is inactive unless the blower is on. Moreover, the blower only runs when the furnace is operating so that the humidifier is automatically shut down during the summer months.

A modified form of the invention may be seen by reference to FIG. 3, which is suitable for a gravity flow heating system, and which also includes provision for inactivating the humidifier unless the heating system is operating. A humidifier valve, shown generally as 38, is supplied with water under pressure through a pipe 39. The water flows through an orifice 40 leading from valve seat 41 to a nozzle 16, which may be similar to the aforementioned nozzle. Valve seat 41 is arranged to be blocked off by a valve plunger 42. A pivoted lever 43 and a connecting spring 44 provided a positive off-on movement of valve plunger 42 upon a relatively slight rotation of lever 43. Connected to lever 43 is an extending rod 45, which carries a moisture control member 46 on its outer end. Member 46 is similar to the aforementioned moisture control member 15, except that greater care is required in selecting the material so that it is non-flammable and resistant to long time exposure to heat. Downward movement of the member 46 pivots rod 45 and lever 43. This actuates valve plunger 42 to close off valve port 41, thereby to shut off the flow of water. A temperature-sensitive bimetallic strip 47 is attached to valve 38 and curves upward, when heated, to bias rod 45 to the elevated position shown to act as a spring. When the bimetallic strip is unheated, it assumes the position shown by phantom lines 47' and the moisture control lever likewise is depressed as shown by the phantom lines 45'.

Rather than placing the humidifier control of FIG. 3 in the cold air return duct, it is disposed adjacent the heating pipes from the furnace, one of which is seen as 48, so that the heat thereof when the furnace is on will cause the bimetallic strip 47 to curve and bias rod 45 upward. Thereafter strip 47 serves as a spring to provide the same function as spring 26 in FIG. 2.

The operation of the aforedescribed humidifier controls will be apparent from the following description. In the arrangements of both FIG. 2 and FIG. 3, the operation is substantially the same. When the moisture control member is dry, it will be in an elevated position and the respective valves will be open to allow water to spray through the nozzles. Water gradually saturates the moisture control members. When the added weight of the saturated member overcomes the upward spring biasing of the switch spring 26 or the bimetallic strip 47 in FIGS. 2 and 3 respectively, the plate will descend and shut off the flow of water. Members 15, 46 will periodically rise and fall to shut the spray on and off, but for varying time intervals as follows.

The device is responsive to the actual humidity of the air flowing past it. Water flows through the nozzle for the length of time that is required for water to saturate the moisture control member. This time is dependent on two factors, i.e. the inherent natural ability of the member to soak up water, and also the rate at which water is being evaporated from the member by air flowing past it. Thus water is both being added to and subtracted from the moisture control member simultaneously. The difference or net rate of water addition determines the time required for the moisture control member to actuate the valve. The rate at which moisture is evaporated from the member is highly dependent upon the ambient relative humidity. Thus the more humid the air flowing past the moisture control member, the quicker it will become saturated, and the sooner the humidifier spray will be shut off.

The length of time required for the member to dry out when it is lowered and therefore turn the nozzle on again, is also dependent upon the ambient humidity in a similar manner. The more humid the air, the longer it will take for the member to dry out, and thus the longer the time interval before the spray is again actuated. By proper selection of the material of the moisture control member, its size, weight, and disposition with respect to the spray nozzle, and the selection of the proper flow rate for the spray nozzle, the device can be made to hold substantially constant humidity for normal room temperatures, provided the water pressure and air flow are held substantially constant.

It will be noted that the arrangements of FIGS. 2 and 3 are actuated only when the heating plant is furnishing heat to the home. In FIG. 2, the blower is only on when the furnace has raised the temperature in the duct, and unless the blower is on, the solenoid valve can not operate.

Likewise in FIG. 3, the bimetallic strip remains in a straight position unless the heating pipes 48 are hot. In this straight position, strip 47 provides no upward bias on rod 45 and hence valve 38 cannot turn on.

A modified construction for the moisture control members 15, 46 is shown in FIG. 4. There a flattened outer sheath of screen mesh 49 serves to hold strands of fiber 50, such as treated cotton or asbestos. These are packed in an up and down direction and closely packed, so that moisture applied to one end thereof will flow along the strands, which act as a series of wicks, to saturate the entire bundle. The lever 51 supporting the moisture control member is held by crossarms 52 behind the wire mesh 49.

FIG. 5 illustrates still another modification of the moisture control member. It comprises a wick or rope 60 of fairly large diameter suspended by its upper end on a rod 61 inside a ring clamp 62. Only the lower end 60a is impinged by the spray from the nozzle (not shown).

FIGS. 6 and 7 illustrate another aspect of the invention, wherein the improved humidifier control compensates both for variations in water pressure to the nozzle and for variations in air flow through the heating system, brought about by some cause such as a dirty condition of the air filter 8.

FIG. 6 shows a nozzle 53 emitting a spray cone indicated by lines 54 at normal water pressure upon plate 55. It is known that lower pressure on such a hydraulic nozzle will normally tend to reduce its cone angle, as shown by the reduced pressure spray cone, indicated by phantom lines 56. It will be observed that spray cone 56 impinges upon a smaller surface of plate 55 than does the spray cone 54. Hence, at lower pressure, it will take longer for plate 55 to become saturated than it would if the water pressure were normal. For this reason, the nozzle will be on for a longer period of time during each cycle, thereby compensating for the reduced flow due to low water pressure.

FIG. 7 shows the same nozzle 53 spraying with a cone angle defined between lines 57 upon the same plate 55. Nozzle 53 is situated near the downstream edge 55a of plate 55, the direction of airflow here being designated by arrow 58. Increased velocity of air flow will deflect the cone to the position shown by the phantom lines 59. Hence with a stronger air flow, the spray will be deflected away from the plate, wetting less of the plate, and a longer time will be required for plate 55 to become saturated. More grains of moisture during the cycle will be added for the greater rate of air flow. Thus compensation is automatically made as the air flow rate varies.

It will be apparent that the foregoing humidifier control provides a controlled flow of moisture to the ducts of a heating system and that the controller is responsive to the ambient humidity of the air moving past it, which is also repesentative of the ambient humidity in the house. Therefore no additional "humidistat" or moisture control device is needed.

It will further be apparent that where the design parameters of the humidifier are selected to hold the humidity substantially constant with a preselected water pressure and air flow, additional compensation for variations in water pressure and air flow is provided.

The device shown is simpler than many prior art humidifiers and automatically ceases operation at the end of the heating season without further attention. It operates with reduced frequency during periods of low heat demand, when the necessity for humidifying is much less.

The device incorporates actual humidity sensing not found in most atomizer type units, and overcomes the deficient moisture addition capabilities of evaporative type humidifiers.

It will be apparent that the invention herein disclosed is not restricted to the foregoing modifications shown. Other modifications will occur to those skilled in the art, and it is intended to cover in the appended claims all such modifications as fall within the true spirit and scope of the invention.

What I claim as new and desire to secure by Letters Patent of the United States is:

1. A controlled humidifier for use in a duct system having means recirculating a flow of air through a space to be humidified and including means for heating said air, said humidifier comprising:

valve means connected to a source of water under pressure, an atomizing nozzle connected to said valve means and adapted to spray water therefrom into said duct system to thereby control the humidity in said space and in said duct system, a moisture control member comprising a vertically movable absorbent body adapted to be disposed in said duct system in the path of the air flowing therethrough and arranged to receive a portion of the spray from said nozzle on one end thereof and being constructed so as to become gradually saturated by the water from said nozzle, means controlled by the movement of said body and connected to open said valve means when the body is elevated and to close said valve means when the body is lowered, means biasing said body to the elevated position when a portion of the saturating water has evaporated therefrom, and, means adapted to disable the humidifier when the air heating means is inactive.

2. The combination according to claim 1, wherein said absorbent body comprises a flat porous plate that is adapted to be disposed normal to the spray and wherein said nozzle is constructed to cause a spray cone to impact upon said plate with a cone angle which decreases with decreased water pressure from said source.

3. The combination according to claim 1, wherein said valve means is operated by a solenoid coil, said controlling means includes a switch connected in series with said coil, and said disabling means includes an interruptable source of electrical power connected to the switch and coil.

4. The combination according to claim 1, wherein said absorbent body comprises a plurality of fibrous wicks held together in a relatively thin flat bundle by an outer rigid sheath of screen mesh.

5. The combination according to claim 1, wherein said absorbent body comprises a woven fibrous rope suspended so that the lower end thereof hangs in the path of spray from said nozzle.

6. In a forced draft heating system of the type having fan means causing periodic recirculating airflow through a duct system, said fan means being operated by a periodic electric current in response to a selected temperature condition in said duct system, the combination of:

valve means connected to a source of water under pressure and having a solenoid coil controlling the opening and closing of said valve means, a switch connected in series with said coil, said switch and said coil being connected to receive periodic electric current from the same source as said fan means, an atomizing nozzle connected to said valve means to spray water therefrom into said duct system to thereby control the humidity therein, a moisture control member comprising a vertically movable absorbent body disposed in said duct system in the path of the air flowing therethrough and arranged to receive a portion of the spray on one end thereof and being constructed so as to become gradually saturated by the water from said nozzle, lever means supporting said body and operating said switch to cause the valve means to close when the body descends and to open when the body rises, and means biasing said body to the raised position when a portion of the saturating water has evaporated therefrom.

7. In a gravity flow heating system of the type having a duct system containing flue gas pipes which are periodically heated in response to a temperature condition, the combination of:

valve means connected to a source of water under pressure, an atomizing nozzle connected to said valve means to spray water therefrom into said duct system, a moisture control member comprising a vertically movable absorbent body arranged to receive a portion of the spray on one end thereof and being constructed so as to become gradually saturated by the water from said nozzle, means supporting said body including linkage means connecting the body with the valve means and arranged to close the valve when the body descends and open the valve when the body rises, and, a bimetallic temperature-sensitive element disposed adjacent said flue gas pipes and arranged to curl and provide a force biasing said supporting means upward when heated by said pipes, the biasing force being such as to cause the absorbent body to rise when a portion of the saturating water has evaporated therefrom.

8. A controlled humidifier for use in a duct system having a flow of air therethrough into a space to be humidified and including means for heating said air, said humidifier comprising:

valve means connected to a source of water under pressure, an atomizing nozzle connected to said valve means and adapted to spray water therefrom into said duct system, a moisture control member comprising a vertically movable absorbent body arranged to receive a portion of the spray from said nozzle on one end thereof, and being constructed so as to become gradually saturated by the water from said nozzle, the spray receiving end of said absorbent body being adapted to be on the downstream end thereof with respect to the airflow through the duct system, so that increased airflow will deflect the spray away from the body and delay saturation thereof, means controlled by the movement of said body and connected to open said valve means when the body is elevated and to close said valve means when the body is lowered, means biasing said body to the elevated position when a portion of the saturating water has evaporated therefrom, and means adapted to disable the humidifier when the air heating means is inactive.

9. A controlled humidifier for use in a duct system having a flow of air therethrough into a space to be humidified and including means for heating said air, said humidifier comprising:

valve means connected to a source of water under pressure, an atomizing nozzle connected to said valve means and adapted to spray water therefrom into said duct system, a moisture control member comprising a vertically movable absorbent body arranged to receive a portion of the spray from said nozzle on one end thereof and being constructed so as to become gradually saturated by the water from said nozzle, means controlled by the movement of said body and connected to open said valve means when the body is elevated and to close said valve means when the body is lowered, means biasing said body to the elevated position when a portion of the saturating water has evaporated therefrom, and means adapted to disable the humidifier when the air heating means is inactive, said disabling means comprising a bimetallic temperature-sensitive strip adapted to be responsive to the air heating means and arranged to cooperate with said controlling means to act also as the biasing means when heated.

References Cited by the Examiner

UNITED STATES PATENTS

| | | | |
|---|---|---|---|
| 2,577,337 | 12/51 | Lancaster | 239—65 |
| 2,584,650 | 2/52 | Woodruff | 126—13 |
| 2,708,435 | 5/55 | Lewis | 126—113 |
| 2,875,991 | 3/59 | Ruegsegger | 126—113 X |
| 2,895,493 | 7/59 | Edwards | 239—65 X |
| 2,969,186 | 1/61 | Geiger | 239—65 |

EDWARD J. MICHAEL, *Primary Examiner.*